United States Patent
Guillemain et al.

(10) Patent No.: US 12,205,286 B2
(45) Date of Patent: Jan. 21, 2025

(54) AUTOMATIC BRAIN MODEL EXTRACTION

(71) Applicant: DASSAULT SYSTEMES, Vélizy-villacoublay (FR)

(72) Inventors: Antoine Guillemain, Vélizy-villacoublay (FR); Benoît Sarthou, Vélizy-villacoublay (FR); Nicolas Gazères, Vélizy-villacoublay (FR)

(73) Assignee: DASSAULT SYSTEMES, Vélizy-villacoublay (FR)

( * ) Notice: Subject to any disclaimer, the term of this patent is extended or adjusted under 35 U.S.C. 154(b) by 344 days.

(21) Appl. No.: 17/821,335

(22) Filed: Aug. 22, 2022

(65) Prior Publication Data

US 2023/0056102 A1  Feb. 23, 2023

(30) Foreign Application Priority Data

Aug. 23, 2021  (EP) .................................... 21306137

(51) Int. Cl.
   *G06T 7/00*  (2017.01)
   *G06T 7/11*  (2017.01)
   *G06T 17/20* (2006.01)

(52) U.S. Cl.
   CPC .............. *G06T 7/0012* (2013.01); *G06T 7/11* (2017.01); *G06T 17/20* (2013.01); *G06T 2207/10088* (2013.01); *G06T 2207/30016* (2013.01)

(58) Field of Classification Search
   None
   See application file for complete search history.

(56) References Cited

U.S. PATENT DOCUMENTS

| | | | | |
|---|---|---|---|---|
| 2004/0240753 | A1* | 12/2004 | Hu | G06T 7/68 382/286 |
| 2008/0292194 | A1* | 11/2008 | Schmidt | G06T 7/0012 382/131 |
| 2012/0314926 | A1* | 12/2012 | Ghosh | G06V 10/28 382/131 |

OTHER PUBLICATIONS

Smith, "Fast robust automated brain extraction" Human Brain Mapping 2002—Wiley Online Library. URL:https://onlinelibrary.wiley.com/doi/full/10.1002/hbm.10062.

F. Ségonne et al. "A hybrid approach to the skull stripping problem in MRI". In:NeuroImage22.3(Jul. 2004), p. 1060-1075. (Abstract page) ISSN: 10538119.DOI:10.1016/j.neuroimage.2004.03.032. URL:https://linkinghub.elsevier.com/retrieve/pii/S105381190400188.

(Continued)

*Primary Examiner* — Darryl V Dottin
(74) *Attorney, Agent, or Firm* — Oblon, McClelland, Maier & Neustadt, L.L.P.

(57) ABSTRACT

A method of segmentation of a medical image of a human brain including obtaining a voxelized 3D medical image of the human brain, computing at least two surface models of the human brain using a BET method, each surface model being computed for a unique fractional constant $b_t$. For each computed surface model, determining a volume included in the computed surface model, thereby obtaining a set of sample pairs, fitting a curve to the sample pairs of the set, determining an inflection point of the curve, identifying a fractional constant bt corresponding to the determined inflection point, and computing the surface model of the human brain using the BET method that is dependent of bt.

20 Claims, 9 Drawing Sheets

(56) References Cited

OTHER PUBLICATIONS

David W Shattuck, et. al.,"Construction of a 3D probabilistic atlas of human cortical structures" (Abstract page) ScienceDirect. URL:https://www.sciencedirect.com/science/article/abs/pii/S1053811907008099?via%3Dihu.

Daniel S. Marcus et al. "Open Access Series of Imaging Studies (OASIS) : Cross-sectional MRI Data in Young, Middle Aged, Nondemented, and Demented Older Adults". In:Journal of Cognitive Neuroscience19.9 (Sep. 2007), p. 1498-1507.ISSN: 0898-929X, 1530-8898.DOI:10.1162/jocn.2007.19.9.1498. URL:http://www.mitpressjournals.org/doi/10.1162/jocn.2007.19.9.1498.

J. E. Iglesias et al. "Robust Brain Extraction Across Datasets and Comparison With Publicly Available Methods". In :IEEE Transactions on Medical Imaging30.9 (Sep. 2011), p. 1617-1634. (Abstract page) ISSN: 0278-0062, 1558-254X.DOI:10.1109/TMI.2011.2138152. URL:http://ieeexplore.ieee.org/document/5742706/.

Daniel Perrin "Les courbes de Bezier" URL: https://www.imo.universite-paris-saclay.fr/~perrin/CAPES/geometrie/BezierDP.pdf.

The extended European search report mailed Feb. 15, 2022 in corresponding European Patent Application No. 21306137.7 (7 pages).

Popescu V, et al., "Optimizing parameter choice for FSL-Brain Extraction Tool (BET) on 3D T1 images in multiple sclerosis," Neuroimage, Elsevier, Amsterdam, NL, vol. 61, No. 4, Mar. 19, 2012 (Mar. 19, 2012), pp. 1484-1494, XP028490473.

Yudthaphon Vichianin PhD, et al. "Optimizing Fractional Intensity Threshold for FSL-Brain Extraction Tool (BET) and Comparing with FreeSurfer on 3D T1W MR Images," Siriraj Medical Journal, Oct. 2018 (Oct. 2018), pp. 391-396, XP055885940.

Anonymous: "excel—Finding the Inflection Point—Stack Overflow," Jun. 26, 2013 (Jun. 26, 2013), XP055886322, Retrieved from the Internet: URL:https://stackoverflow.com/questions/17 324033/finding-the-inflection-point [retrieved on Feb. 2, 2022].

Anonymous: "matlab—Using inflection point as threshold for segmentation—Stack Overflow," May 30, 2019 (May 30, 2019), XP055886326, Retrieved from the Internet: URL:https://stackoverflow.com/questions/56 377308/using-inflection-point-as-threshold-for-segmentation [retrieved on Feb. 2, 2022].

\* cited by examiner

AUTOMATIC BRAIN MODEL EXTRACTION

CROSS REFERENCE TO RELATED APPLICATIONS

This application claims priority under 35 U.S.C. § 119 or 365 to European Application No. 21306137.7, filed Aug. 23, 2022. The entire contents of the above application are incorporated herein by reference.

TECHNICAL FIELD

The present disclosure relates to the field of computer programs and systems, and more specifically to a method, system and program for segmentation of a medical image of a human brain.

BACKGROUND

A number of methods, systems and programs exist for reconstructing 3D models of the human brain from Magnetic Resonance Imaging (MRI) images. MRI images provide information on the tissues of the head of the patient, including brain tissues and non-brain tissues (e.g., skull, dura and eyes). Only brain tissues are relevant for 3D reconstruction, so the MRI image needs to be preprocessed in order to remove non-brain tissue from the other parts of the image, for example, extracting white matter, gray matter, and/or intraventricular cerebrospinal fluid (CSF) from the MRI data.

For example, methods such as "Fast Robust Automated Brain Extraction", Smith, S. M., (2002) perform mesh-based image segmentation from structural Magnetic Resonance Imaging (MRI) images of the head of the patient. Methods such as the method of Smith, S. M. depends on main argument parameter which controls the quality of the segmentation. However, there is no pre-defined value that achieves a best fit with respect to a given input MRI image. This is because any best-fit value differs according to the specific MRI image, which in turn is dependent on multiple uncontrolled variables, for example, different MRI devices, acquisition sequences, MRI image acquisition parameters such as contrast, noise, resolution. The MRI image also varies depending on the subject patient.

In such methods, the user needs to manually adjust parameters of the segmentation algorithm and needs to perform several test runs to obtain a best fitting model. Thus, the user needs to identify visually whether the runs lead to an over-segmented brain (including tissues that does not belong to the brain), or to an under-segmented brain (with some tissues of the brain missing). On one hand, this process is simply unpractical over large datasets of medical images. On the other hand, relying on manual selection introduces user bias.

Within this context, there is still a need for an improved method for segmentation of a medical image of a human brain.

SUMMARY

It is therefore provided a computer-implemented method of segmentation of a medical image of a human brain. The method comprises providing a voxelized 3D medical image of the human brain, each voxel of the 3D medical image comprising at least one value representing a tissue characteristic of the human brain. The method also comprises computing at least two surface models of the human brain using a brain extraction tool (BET) method that is dependent of a fractional constant $b_t$ varying between 0 and 1, each surface model being computed for a unique fractional constant $b_t$. The method further comprises, for each computed surface model, determining a volume (Volume_$b_t$) comprised in the computed surface model, thereby obtaining a set of sample pairs ($b_t$, Volume_$b_t$). The method comprises fitting a curve to the sample pairs ($b_t$, Volume_$b_t$) of the set. The method comprises determining an inflection point of the curve. The method comprises identifying a fractional constant $\tilde{b}_t$ corresponding to the determined inflection point. The method also comprises computing the surface model of the human brain using the BET method that is dependent of the identified fractional constant $\tilde{b}_t$.

In examples, the method may further comprise one or more of the following features:
- the voxelized 3D medical image is a magnetic resonance imaging (MRI) image;
- the curve is a smooth curve;
- the smooth curve is a Bézier curve;
- the Bézier curve is of degree larger than four and lower than eight;
- the fitting the curve comprises solving a least squares problem;
- determining the inflection point of the curve comprises:
    computing the first derivative of the curve; and
    computing an inflection point of the curve from a point where the first derivative of the curve is zero.
- computing the first derivative comprises computing finite differences between sample points of the curve;
- computing the inflection point of the curve comprises:
    computing a second derivative of the curve;
    computing the inflection point of the curve by:
        sampling uniformly points of the second derivative of the curve;
        determining sampled points of the second derivative of the curve having value zero;
        computing a neighborhood of sampled points enclosing the determined points having value zero;
        determining a change of sign for at least one pair of sample points at the neighborhood of sampled points;
- identifying the fractional constant $\tilde{b}_t$ corresponding to the determined inflection point is performed by setting the determined inflection point as the fractional constant $\tilde{b}_t$;
- computing the at least two surface models of the human brain is parallelized over the samples of the fractional constant $b_t$;
- the obtained set of sample pairs ($b_t$, Volume_$b_t$) is determined for the fractional constant $b_t$ that is comprised between the interval [0.4, 0.8].

It is also proposed a computer program comprising instructions for performing the computer-implemented method.

It is further proposed computer readable storage medium having recorded thereon the computer program.

It is further proposed a system comprising a processor coupled to a memory and a graphical user interface, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
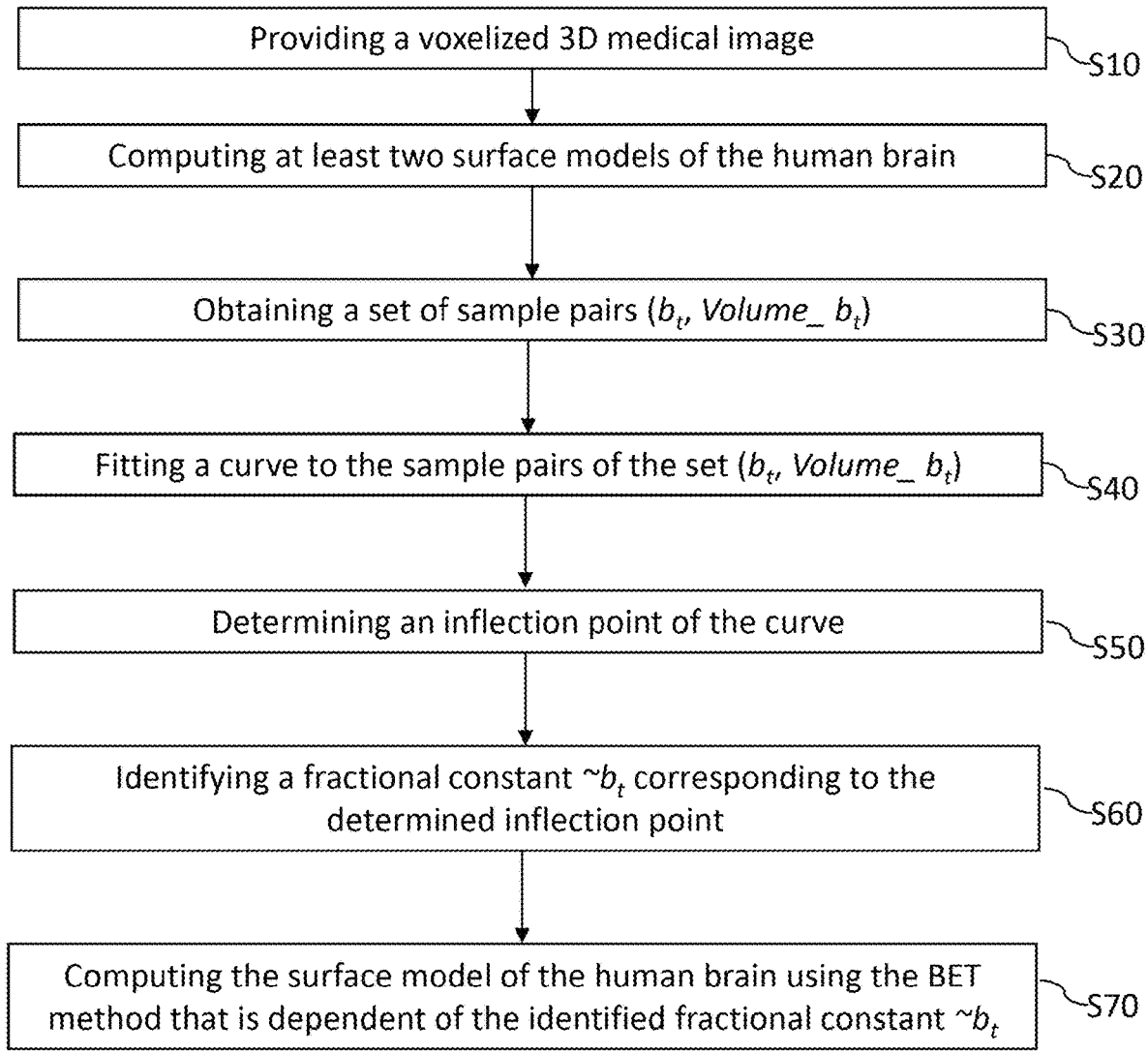
FIG. 1 shows a flowchart of an example of the method.

With reference to the flowchart of FIG. 1, it is proposed a computer-implemented method of segmentation of a medical image of a human brain. A medical image is any representation, which may be visualized on a computer, of at least a part of the human body. Medical images may be obtained from different medical imaging techniques that scan the human body to scan internal (i.e., hidden by the skin) structures, such as bones, organs and other tissues. Medical imaging techniques may incorporate, e.g., techniques from radiology, magnetic resonance imaging, ultrasound, endoscopy, elastography, tactile imaging, medical photography or the like. Medical imaging techniques scan the internal tissue and create the medical image by assigning values to each component of the representation of the medical image, e.g., a component is a tissue characteristic of the human brain. The method comprises providing S10 a voxelized 3D medical image, obtained by medical imaging techniques, of the human brain. By "voxelized 3D medical image" it is meant any medical image which is represented by voxels. A voxel is a volumetric element which may be identified by three dimensional coordinates (e.g., x-y-z coordinates) on a three-dimensional grid. The number of voxels in the three-dimensional grid define the voxel resolution of the image. The voxel resolution may be predefined by the medical imaging technique that obtains the voxelized 3D medical image. The voxel may include further information of the 3D modeled object such as, e.g., depth, color, opacity or any other value representative of part of the human body that is supposed to represent in the grid, e.g., representative of tissue such as skin or muscles. Some examples of voxelized 3D medical images include voxelized images obtained from medical imaging techniques such as MRI data, ultrasounds or CT scans or the like. The voxelized 3D medical image of the human brain may have been obtained by a medical imaging technique, wherein the medical imaging technique may assign one or more values of different variables on each voxel of the 3D medical image. That is, each voxel may comprise different variables that may be assigned values, and the medical imaging techniques may encode, for each corresponding voxel, a fixed value of a corresponding variable representing a characteristic tissue.

Each voxel of the 3D medical image comprises at least one value representing a tissue characteristic of the human brain. A tissue characteristic of the human brain may be any tissue that is included in the forebrain, midbrain, hindbrain and intra-ventricular cerebrospinal fluid. In other words, the brain tissue characteristic of the human brain may be any tissue of the top part of the nervous system delimited (and including) by the medulla. By means of example, tissues non-characteristic of the human brain include, for example, optic nerves, eyes, scalp, extra-cerebral cerebrospinal fluid, dura or otorhinolaryngology areas. The at least one value representing a tissue characteristic of the human brain may be any type of value (e.g., a scalar or a multidimensional vector) assigned to a variable encoded in each voxel, wherein the variable represents the tissue characteristic of the human brain. That is, the variable may represent at the corresponding voxel, e.g., brain tissue and/or non-brain tissue, and the at least one value is the current value assigned to the variable at the corresponding voxel. Thus, each voxel of the voxelized 3D medical image is assigned a current value of a corresponding variable, as assigned by, e.g., the medical imaging process that captured the medical image. The current values may be set by any type of convention, e.g., non-negative normalized values, wherein a value of zero indicates that the variable does not encode a representation of the characteristic tissue, and value of 1 indicates that the variable encodes the representation of the characteristic tissue.

The method also comprises computing S20 at least two surface models of the human brain using a brain extraction tool (BET) method. The BET method is a method that segments voxelized medical images of the human brain. That is, the BET method takes as input at least a medical image, and outputs a segmentation if the voxelized image, i.e., the BET method generates a partition of the voxelized image and outputs a (three-dimensional) surface model corresponding to one of the partitions. In the case of the BET method, the method detects the boundaries of the human brain in the voxelized medical image and outputs a surface model that is delimited by said boundaries. The BET method is dependent of a fractional constant $b_f$ varying between 0 and 1. That is, the BET method takes also as input the fractional constant $b_f$, and the output model surface also depends on this input. The fractional constant $b_f$ modifies how the BET method detects the boundaries of the human brain in the voxelized image and may modifying the output model surface. Indeed, the BET method only segments voxels having the at least one value of the human brain; however the medical image may comprise several values of other tissues, e.g., within real valued intervals. The fractional constant $b_f$ determines a cutoff of the values of non-characteristic tissue. Voxels having values of non-characteristic tissue below the cutoff determine the boundary of the segmented model, thereby being excluded from the segmentation.

The BET method may be implemented by any known methods in the art, for example, "Fast Robust Automated Brain Extraction", Smith, S. M., 2002 November; 17(3): 143-55. doi: 10.1002/hbm.10062.

In one or more (all) examples (that is, for any possible combination of one or more examples described in this description), the original BET method as described in the document "Fast Robust Automated Brain Extraction", Smith, S. M., 2002 November; 17(3):143-55. doi: 10.1002/hbm.10062, may be used for carrying out the concerned method steps, the content of this whole document is therefore incorporated by reference. Especially, FIG. 1 represents the steps of the original BET processing flowchart; the section from p.145, right column to p.151, first and second paragraphs of left column included (referred to as "Second pass: increased smoothing"), relates to the flowchart of FIG. 1 and describes examples of the flowchart of FIG. 1. The content of FIG. 1 and the above mentioned section are therefore incorporated by reference. Thus, in one or more (all) examples, when the method of the present disclosure recites "computing a surface model of the human brain using the BET method", the following steps of the original BET method, that are incorporated by reference, are performed:
  (i) estimating a basic image and brain parameters, as disclosed on p. 145-146;
  (ii) modeling the brain surface by a surface tessellation, as disclosed on p. 146;
  (iii) updating each vertex of the tessellated surface by estimating where best that vertex should move to, to improve the surface, as disclosed on p. 147. Thus, for each vertex, a small update movement vector u is calculated, using the following sub-steps:
    (iii.a) founding a local unit vector surface normal n, as disclosed on p. 147;
    (iii.b) computing the mean position of all vertices neighboring the vertex, as disclosed on p. 147;
    (iii.c) computing a first component u1 of the update movement vector u, the first component being tangential to the local surface, as disclosed on p. 147;
    (iii.d) deriving a second component u2 of the update movement vector u from sn of the equation (1) on p. 147, as disclosed on p. 147 and p. 148;
    (iii.e) computing a third component u3 of the update movement vector u, the third component u3 being a term that actually interacts with the image, attempting to force the surface model to fit to the real brain surface. The computing is performed as discussed in p. 149;
    (iii.f) calculating the update movement vector u with the first, second and third components using the equation (13), as disclosed on p. 150.
  (iv) performing a check for self-intersection of the updated tessellated surface, and f the surface is found to self-intersect, the step (iii) is re-run, with much higher smoothness constraint, as disclosed on p. 151.

The BET method may, e.g., take a single voxelized image as input, and execute segmentation depending on at least two fractional constants $b_t$ as input, e.g., performing each segmentation sequentially for each of the multiple fractional constants $b_t$, or performing each segmentation with a parallel processor, wherein each thread of the processor executes an instance of the BET method taking as input the same voxelized image and a different fractional constant of the multiple fractional constants $b_t$. Since the BET method outputs a model surface depending of the value of the corresponding input fractional constants $b_t$. For example, each fractional constant $b_t$ may vary at discrete values between the range [0,1], e.g., [0.1, 0.2, . . . , 0.9]. The BET method computes a surface model from the provided voxelized 3D medical image and outputs a surface model according to the dependence on each value. Each surface model of the at least two surface models is computed for a unique fractional constant $b_t$.

For each computed surface model, the method also comprises determining S30 a volume Volume_$b_t$ comprised in the computed surface model, thereby obtaining a set of sample pairs ($b_t$, Volume_$b_t$), for example a set of pairs [(0.1, Volume_0.1), (0.2, Volume_0.2), . . . , (0.9, Volume_0.9)]. The set of sample pairs ($b_t$, Volume_$b_t$) may be seen as defining a graph of a function, where each value of the fractional constant corresponds to a point in the domain of the function and the corresponding volume corresponds to the codomain of the function. The volume may be computed by adding the number of voxels of the segmented surface model of the brain.

The method also comprises fitting S40 a curve to the sample pairs ($b_t$, Volume_$b_t$) of the set. This process can be seen as continuously interpolating the graph of the function defined by the set of sample pairs, thereby allowing to perform operations on the approximation achieved by the continuous interpolation instead of the graph, which is of discrete nature. The method also comprises determining S50 an inflection point of the curve. That is, the method determines a point of the curve where the curve intersects a tangent. This is the case when a derivative of the curve is a relative maximum or minimum. The expression relative maximum or minimum encompasses the case where the derivative of the curve is an absolute maximum or minimum. Hence, the curve can have one plate (in case of absolute maximum or minimum) or several plate in case of relative maximum or minimum. The method also comprises identifying S60 a fractional constant $b_t$ corresponding to the determined inflection point. That is, the method comprises identifying the fractional constant $b_t$ at the point in the graph at which the curvature of the fitted curve changes sign. The method also comprises computing S70 the surface model of the human brain using the BET method that is dependent of the identified fractional constant $b_t$.

Such a method improves human brain reconstruction. Indeed, the computed model is dependent to the identified fractional constant $b_t$ corresponding to the inflection point. The inflection point determines flat regions of the curve. That is, a small variation around the identified fractional constant $b_t$ produces a small variation in the output surface model, i.e., the corresponding volume remains similar. The inventors have found that regions of the curve having small variation correspond to satisfactory values that segment the tissue characteristic of the human brain. In turn, the method improves ergonomics of use to the user, as the automation of the search of a best fitting surface model relieves the user from performing manual fine tuning of the fractional constant $b_t$. The method is particularly efficient on a large datasets of voxelized 3D medical images. On one hand, the method determines the curve independently of the voxel resolution of the voxelized 3D medical image. This is because the determination of the curve is dependent on the volume of the computed surface models determined in step S30, rather than the voxel resolution of the 3D medical image. This is especially true when handling low resolution 3D voxelized images, where computing a volume directly may introduce noise due to the large size of the voxels. Thus, the method is particularly efficient to find the output surface model across variations of voxel resolutions. On the other hand, the automation achieved by the method removes inter-operator bias. A human precise fine-tuning cannot be expected to perform brain surface model computation on each voxelized 3D medical image. The automation of the computation of surface model achieved by the method leads to an improvement of quality in the study results. Indeed precise whole brain surface models plays an important role for further processing, e.g., brain atlas parcellation, registration or brain volume estimation for Alzheimer's disease.

The method is computer-implemented. This means that steps (or substantially all the steps) of the method are executed by at least one computer, or any system alike. Thus, steps of the method are performed by the computer, possibly fully automatically or semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 10:
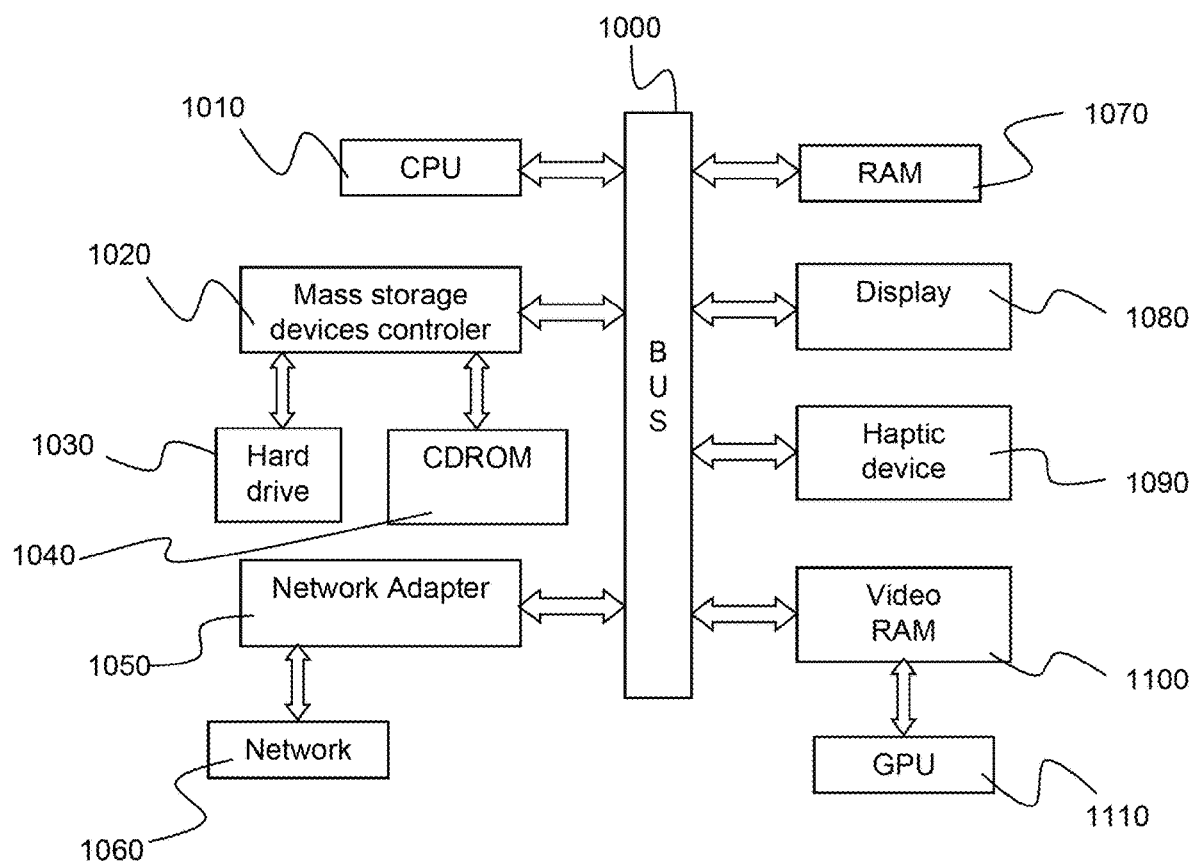
FIG. 10 shows an example of the system.

FIG. 10 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The BET method, e.g., such as the one disclosed in the document "Fast Robust Automated Brain Extraction", Smith, S. M., 2002 November; 17(3):143-55. doi: 10.1002/hbm.10062, is dependent of a fractional constant $b_f$ varying between 0 and 1. That is, for a given fractional constant $b_f$ (that is, given in the interval between 0 and 1 and provided as a parameter to the BET method) and the provided voxelized 3D medical image, the BET method outputs a surface model of the brain from the input, where non-brain voxels have been removed. In other words, the BET method performs a binary mask that segments the brain from the provided voxelized 3D medical image, with a resulting quality relying on the a given fractional constant $b_f$.

The BET method may set an initial surface (the initial surface being a mesh) intersecting the voxelized 3D image. For example, the initial shape may be a mesh sphere. The BET method may set the initial surface according to any method. For example, the BET method may place an initial sphere on the center of the image. In other example, the BET method may perform a basic estimation differentiating the at least one value characteristic of the human brain from the other values, e.g., defining an initial region where the at least one value is above a background threshold t. The method may compute the background threshold t by computing the cumulative histogram of the at least one characteristic value of all the voxels of the 3D voxelized image. The method may first define a global minimum threshold $t_2$, which may be chosen as the value lying at 2% of the cumulative distribution. The method may also define a global maximum threshold $t_{98}$, which may be chosen as the value lying at 98% of the cumulative distribution. The method may determine the background threshold t as the value lying 10% between the global minimum threshold $t_2$ and the global maximum threshold $t_{98}$. The method may then compute a center of gravity from the voxels whose at least one value is above the background threshold t, and place the initial shape at the position of the center of gravity. The method may also determine a median $t_m$ of the at least one value of al of the voxels enclosed within the initial shape.

The BET method may perform an inflation process so that the initial surface fills the space defined by the human brain, i.e., the method displaces the boundaries of the initial surface outwards from its initial position to fill the space. The inflation of the BET method may be performed through real three-dimensional space, instead of voxel coordinates of the voxelized 3D image to allow local deformation that is not constrained to the resolution of the voxels. To do this, the BET method may perform the inflation of the mesh along the voxels of the head having similar values representing a similar tissue characteristic. The BET method may compute a movement vector for each vertex of the shape, thereby defining the direction of the inflation process of the surface and move the vertices along the normal of the movement vector. The movement vector may stop the inflation process whenever there is an abrupt variation of the values representing a similar characteristic. An example is explained hereinbelow.

The method may loop around the vertices of the mesh of the surface (thereby performing an inflation process throughout vertices of the mesh of the surface) as follows: the method may compute a unit vector surface normal around pairs of vertices around the vertex corresponding to the iteration of the loop. Next, the method may compute a mean position of vertices neighboring the vertex corresponding to the iteration. The neighborhood may be set as a connectivity degree of vertices having a (direct or indirect) connection via an edge to the vertex corresponding to the iteration. For example, neighboring vertices having a connectivity degree one to the vertex corresponding to the iteration are vertices having a direct edge connecting to the vertex; a higher connectivity degree (e.g., two) includes neighboring vertices where there is a path of edges connecting the neighboring vertices to the vertex corresponding to the iteration. This is only a matter of implementation and only modifies the level of local deformation of the surface performed by the inflation process. The method may set the tangential components of the movement vector to be tangential with respect to the mean position of all the vertices neighboring the vertex corresponding to the iteration.

The normal component of the movement vector may be set to be normal with respect to the mean position of all the vertices neighboring the vertex corresponding to the iteration. The normal component of the movement vector reflects the movement outward of the mean position, and is dependent of the fractional constant $b_t$. The method controls the inflation process according to a force term, which is computed iteratively for each vertex and may be based on the corresponding characteristic value of the voxels around the vertex. The method computes this term by determining, along the inward direction of the normal of the vertex of the iteration, a maximal value $C_{max}$(vertex) of the at least one characteristic value around the vertex (corresponding to the iteration) and a minimal value $C_{min}$(vertex) of the at least one characteristic value around the vertex. The maximal value $C_{max}$(vertex) may be determined as the maximum value of the at least one characteristic value of voxels within a neighborhood. The neighborhood may be defined by voxels enclosed in a radius within a respective depth distance $d_{max}$. The minimal value $C_{min}$(vertex) may be determined as the minimum value of the at least one characteristic value of voxels within a neighborhood. The neighborhood may be defined by voxels enclosed in a radius within a respective depth distance $d_{min}$. Both distances $d_{max}$ and $d_{min}$ may be equal or may be set independently of each other.

The force term may be computed according to the following equation:

$$f = \frac{2(C^*_{min}(\text{vertex}) - (C^*_{max}(\text{vertex}) - t_2)b_t + t_2))}{C^*_{max}(\text{vertex}) - t_2}$$

The force term f consists of thresholded and weighted ratio leads by $b_t$ and variables $t_2, t_m, t$, and where $C^*_{min}$(vertex)=max($t_2$, min($t_m, C_{min}$(vertex))) and $C^*_{max}$(vertex)=min($t_m$,max($t_m, C_{max}$(vertex))). The variable $t_2$ corresponds to the global minimum threshold lying below 2% of the cumulative histogram. The variable $t_m$ corresponds to the median of the at least one characteristic value and the pre-estimated variable t corresponds to the background threshold.

The fractional constant $b_t$ determines a cutoff of the values of non-characteristic tissue of the vertex corresponding at the iteration of the loop, according to the force term f. The force term functions as a preset that differentiates the characteristic value of the vertex corresponding at the iteration of the loop with respect to the background threshold. When the maximum threshold is equal to the background threshold, the first term in the weighted sum vanishes, thereby indicating a boundary of the segmented model, and indicating the method to stop the update of the normal component of the movement vector. Thus, the method effectively cuts off the voxel from other neighboring elements than the background (indicated by the predetermined input threshold). In other words, the method detects an "abrupt variation" of the value characteristic of the human brain, and stops the iteration and outputs the final surface model.

For each computed surface model, that is, for each surface model outputted by the BET method with respect to the provided 3D voxelized image and a unique fractional constant $b_t$, the method determines S30 a volume comprised in the computed surface model. By "volume" it is meant the amount of space (expressed as a single numerical value) occupied by a 3D model object in three-dimensional space. The volume is comprised in the computed surface model, that is, the space e.g., the largest volume contained in the space occupied by the computed surface model in three-dimensional space. The method may associate the computed volume, expressed in any dimensional units, with the unique fractional constant $b_t$ used for computing the corresponding surface model, for all of the (at least two) surface models of the human brain, thereby obtaining a set of sample pairs ($b_t$, Volume_$b_t$). The association may be performed using any data structure that allows such association, e.g., a database. The volume may be computed by any means, e.g., from direct computation of the 3D volume of the computed surface model. Alternatively or additionally, the volume may be computed from the voxels or the input voxelized medical image over which the BET method determined the boundaries of the human brain. The method may count the number of said voxels and set that number as the volume.

The method fits S40 a curve to the sample pairs ($b_t$, Volume_$b_t$). The sample pairs are sample pairs of numerical values, thereby defining a graph, and the method constructs a curve on said graph. The curve is a continuous, at least differentiable function having a domain and a codomain that is fitted to the values on the graph. That is, the domain of the curve is fit so as to be substantially approximate to the unique fractional constants in the set of sample pairs, and the codomain of the curve is fit so as to be substantially approximate to the corresponding values of the volume. By "substantially approximate" it is meant that the method tends to fit the curve to the data so that the codomain of the curve matches geometrically with the set of sample pairs (at least within an error due to the numerical character of the fitting). For instance, as the method knows the value of the sample pairs ($b_t$, Volume_$b_t$), the fitting may be performed so that the distance between said point and at least one point in the domain of the curve is below a predetermined distance threshold. By predetermined threshold it is meant that given the set of points to be fitted and the fitting model to be used, it is possible to calculate a threshold such that the sum of the distances of the points from the curve is less than or equal to the number of points times this threshold. Said otherwise and equivalently, it is possible to calculate a threshold such that the distance of the points from the curve is on average less than or equal to this threshold.

Similarly, for each corresponding volume, the distance between said volume and at least one point in the codomain of the curve is below a predetermined distance threshold. The predetermined distance threshold may be zero, thereby fitting the curve exactly to the sample pairs, i.e., the curve traverses exactly all of the values of the sample pairs. This is a matter of implementation and it can also be implemented by solving an optimization problem that rewards a fit of the curve below the predetermined distance threshold.

The method determines S50 an inflection point of the curve. An inflection point is, by its mathematical definition, a point in the curve at which the curvature changes sign, that is, the curve switches from a positive radius (viewed from the graph) to negative. The inflection point may be determined from any known method. For example, the graph of the curve, e.g., the set of points (x, f (x)) has an inflection point (x̃, f(x̃)) if and only if its first derivative (say, f') has a local maximum at the point x of the domain. By "local" it is meant that the method may determine the single inflection point along a vicinity of the graph of the first derivative of the curve, i.e., a section of the first derivative, which is also a curve. This is known from mathematical analysis and it is just a matter of implementation. The determination may be performed by evaluating direct evaluation of the graph of the first derivative or from analytic methods, e.g., in case the first derivative is a polynomial function, the inflection point may be located from the roots of the polynomial. This is just a matter of implementation.

The method identifies S60 a fractional constant $\tilde{b}_t$ corresponding to the determined inflection point. That is, the method identifies the fractional constant $\tilde{b}_t$ as the value x̃ of the graph (x̃, f(x̃)) where the first derivative has a local maximum. Alternatively, the method may identify the fractional constant $\tilde{b}_t$ from the fractional constants $b_t$, computed at step S20. For example, the method may identify the fractional constant $\tilde{b}_t$ from the fractional constant $b_t$ of the set of sample pairs having a distance to the inflection point below a predetermined distance threshold. This is simply a matter of implementation.

The method also computes S70 the surface model of the human brain using the BET method that is dependent of the identified fractional constant $\tilde{b}_t$. That is, the brain extraction tool takes the parameter $\tilde{b}_t$ and computes a corresponding surface model.

The method thus improves the accuracy of the computation of surface model. Indeed, the surface model is computed from the identified fractional constant that corresponds to the determined inflection point. The inflection point corresponds a point where the derivative of the curve achieves a maximum. The inventors have appreciated that when the BET tool depends on fractional constants $b_t$ at a neighborhood of said inflection point, the BET tool outputs surface models with similar volume (that is, a small variation in segmentation of the voxelized 3D medical image). This property can be interpreted as meaning that the volume remains stable along the surface models, thereby providing well defined shapes of the human brain, that is, a shape that accurately conforms to the pial surface of the brain (i.e., a thin membrane enveloping the brain). The method is capable of providing this accuracy thanks to distinguishing the pial surface surrounded from cerebrospinal fluid circulating in the subarachnoid space. For example, the cerebrospinal fluid may appear as dark voxels in an MRI image.

As the liquid is very dark, relative to the other tissues of the image, the method may provide an accurate segmentation which stops closest to the dark zone delimited by the pial surface. Moreover, the determination of the inflection point in the curve fitted at step S40 regularizes the set of sample points, thereby improving the computation speed of the inflection point without affecting the accuracy of the computed model. Indeed, this corresponds to a smooth interpolation that avoids inaccuracies of the discrete nature of the set of sample points. As the computed model is computed from the identified fractional constant $\tilde{b}_t$, the method identifies the areas where the volume varies very little with respect to the liquid circulating through the subarachnoid space. Since the method computes the surface model using the BET method that is dependent of the identified fractional constant $\tilde{b}_t$, this avoids further user interaction thereby achieving full automation over datasets of medical images and eliminating user bias.

In examples, the voxelized 3D medical image may be a magnetic resonance imaging (MRI) image. MRI images are high resolution voxelized 3D medical images that are particularly accurate for representing human brain tissues. The method thus computes a particularly accurate surface model, due to the fact that the computation of the surface model is performed on a high quality grid of voxels, where information on the tissues can be discerned from the contrast of the image.

In examples, the curve may be a smooth curve, that is, the derivative of order k of the curve, denoted in this example as $f^{(k)}(x)$, k>1, is well defined for any x in the domain of the curve f(x). The determination of the inflection point of a function may be a difficult task that cannot be simply determined via simple analytical methods, so the use of a smooth curve provides more possibilities (analytical and computational) to compute the determination of the inflection point of the curve. For example, a sufficient existence condition for a point of inflection in the case that the curve f (x) is k times continuously differentiable in a certain analytical neighborhood of a point x̃ with k odd and k≥3 is that $f^{(n)}(x̃)=0$ for n=2, . . . , k−1 and $f^{(k)}(x̃)≠0$. If this condition is satisfied, then the curve f(x) has a point of inflection at the point x̃. In other example, the use of a smooth function allows to perform a computational search in a particularly efficient manner. Indeed, the method may sample uniformly the curve corresponding to the first derivative (e.g., 200 samples or more), and perform the search of the maximum along the uniform samples.

In examples, the smooth curve may be a Bézier curve. A Bézier curve is a parametric polynomial curve characterized by its control points. For example, defining n+1 distinct control points in the plane as $\alpha_0, \alpha_1, \ldots \alpha_n$, a Bézier curve of order n is defined by the function:

$$f = x \to \sum_{k=0}^{n} a_k \binom{n}{k} x^k (1-x)^{n-k}.$$

Since the Bézier curve is characterized by its control points, fitting the curve may be performed by adjusting the control points $\alpha_k$ so that the curve fits the set of sample pairs $(b_t, \text{Volume\_b}_t)$. This can be performed by running an optimization problem that rewards an adjustment of the control points along the sample fractional constants $b_t$ of the set of sample pairs $(b_t, \text{Volume\_b}_t)$ so that the Bézier curve fits the corresponding volumes of the set of sample pairs $(b_t, \text{Volume\_b}_t)$. Moreover, the computation of the inflection point can be performed in a particularly efficient manner. Indeed, the first derivative of a Bézier curve of degree n can be computed directly from the polynomial, or it may be computed by simple differences.

In examples, the Bézier curve may be of degree larger than four and lower than eight. A Bézier curve of degree larger than four ensures that the set of sample pairs is well approximated, while a degree lower than eight avoids overfitting. Degrees in between thus yield a good compromise between obtaining a regularized curve and a correct fitting of the sample pairs.

In examples, the fitting (S40) the curve may comprise solving a least squares problem. That is, the method may fit the Bézier curve to the set of sample pairs by minimizing a sum of squares that reduces the difference between the codomain of the Bézier curve and the volumes of the set of sample pairs. Such least squares problem may be performed to find the control points that minimize the difference. For example, fitting the curve may be performed by solving the following least squares problem expressed as:

$$\min_{\tilde{a} \in \mathbb{R}^n} \|M \times \tilde{a} - Vol\|^2$$

In the above equation, M is a matrix of size T×(n+1), with T being the number of samples of the set of sample pair($b_t$, Volume_$b_t$)s and n is the degree of the Bézier curve. Vol is a vector of dimension T that collects all of the volumes Volume_$b_t$ of the set of sample pairs ($b_t$, Volume_$b_t$). The components of M and Vol are given by:

$$M_{t,j+1} = \binom{n}{j}(b_t)^j (1-b_t)^{n-j} \text{ with } 0 < t \le T \text{ and } 0 \le j \le n$$

$$Vol_t = \text{Volume\_}b_t \text{ with } 0 < t \le T.$$

Solving the above least squares problem yields a vector á of Bézier control points. The optimization thus leads to the approximating volume function f expressed as $$f = x \to \sum_{k=0}^{n} \tilde{a}_k \binom{n}{k} x^k (1-x)^{n-k},$$

where each $\tilde{a}_k$ is the Bézier control point found via the optimization.

In examples, determining (S50) the inflection point of the curve may include computing the first derivative of the curve. As previously said, the computation of the first derivative may be performed via analytical methods or by approximate methods, e.g., computation from differences. The method may also compute an inflection point of the curve from a point where the first derivative of the curve is zero. This allows to categorize the inflection point, indeed, if the value of the first derivative is zero at the point, the point is a stationary point of inflection, whereas if it is not zero, it is a non-stationary point of inflection. This improves the finding of maxima and minima of the derivative of the curve, by searching for inflection points that are non-stationary, which correspond to extrema of the derivative of the curve.

In examples, computing the first derivative comprises computing finite differences between sample points of the curve. That is, the derivative is computed as f'($x_t$)=(f($x_{t-1}$)−f($x_t$))/($x_{t-1}$−$x_t$) for given sample points $x_t$ and $x_{t-1}$ of the domain of the function f. The computation via numerical differences is particularly fast in the case where the direct computation of the derivative via analytical methods is difficult.

In examples, computing the inflection point of the curve (the curve being at least twice differentiable or having derivatives of higher order more, e.g., the curve being a smooth curve) may comprise computing a second derivative of the curve. The use of a second derivative may be used to take advantage of mathematical existence conditions of the inflection point: a general existence condition requires that the second derivative of the curve has opposite signs at a neighborhood of radius E around a point x̃, that is, all of the theoretical points existing between the interval (x̃−∈, x̃+∈) in the domain of the second derivative. For example, denoting f" the second derivative, f"(x̃+∈) and f"(x̃−∈) have different signs and thus x̃ is an inflection point.

The method may thus compute the inflection point according to the above mathematical concept by sampling uniformly points of the second derivative of the curve. The method may sample the whole domain of the curve and obtain samples of the second derivative. The method may also determine sampled points of the second derivative of the curve having value zero (or at least substantially zero, due to the discrete nature of the sampling, the determination is just a matter of implementation). The method also may compute a neighborhood of sampled points enclosing the determined points having value zero. The method may thus set a uniform sampling of the theoretical (open) interval (x−∈, x+∈), e.g., setting ∈ beforehand around the value x where the second derivative is zero, e.g., f"(x)=0, and obtain corresponding samples of the curve interval (f"(x−∈), f"(x+∈)). It remains now to determine whether the point is an inflection point. For this, the method may also determine a change of sign for at least one pair of sample points at the neighborhood of sampled points. That is, the method may compare the signs in both intervals on the samples prior and after (or vice-versa) the value f"(x) (recalling that the graph of the curve is a two-dimensional plane) and obtain verify whether the signs are different, e.g., a sample in the interval (f"(x−∈), f"(x)) side is negative and a sample in the interval (f"(x), f"(x+∈)) is positive, or vice-versa. The determination of the inflection point is thus quite efficient, as the method only requires determining whether there is a change of sign.

In examples, identifying (S60) the fractional constant $b_t$ corresponding to the determined inflection point may be performed by setting the determined inflection point as the fractional constant $b_t$, that is, the fractional constant is exactly the determined inflection point. This corresponds to the best choice for obtaining an accurate surface model. Indeed, a small variation of values of fractional constant in the curve (fitted in the set of samples ($b_t$, Volume_$b_t$)) around the value of the inflection produces a small variation in the segmentation, and thus the corresponding volumes are similar. The choice of the inflection point thus corresponds to the best (theoretical) choice among the possible values where small variations of fractional constants producing similar volumes.

In examples, computing (S20) the at least two surface models of the human brain may be parallelized over the samples of the fractional constant $b_t$. That is, the method may create several parallel threads in a processor adapted for parallel processing (such as a GPU). Each tread may run an instantiation of the BET method depending on a unique fractional constant $b_t$. This improves computational efficiency, as the method computes the set of sample pairs in one main parallelized thread.

In examples, the obtained set of sample pairs ($b_t$, Volume_$b_t$) may be determined for the fractional constant $b_t$ that is comprised between the (closed) interval [0.4, 0.8]. Such choice may avoid outliers due to the extreme behavior of the algorithm when the fractional constant $b_t$ is outside of those values. Indeed, the algorithm usually never needs to depend on values of $b_t$ outside of the interval. This allows to concentrate the creation of surface models that are significant, i.e., having a least some degree of accuracy for reconstructing human brain tissue. Indeed, when $b_t$ is too small, e.g., smaller than 0.4, the surface model is generally too wide (including scalp optic nerf and other undesired non-brain tissue). A p "too high" generates an under-estimation of the brain.

The invention may be not so limited as in the above examples. For example, the at least two surface models of the human brain parallelized over the samples of the fractional constant $b_t$ may be at least four surface models and fitting a curve to the corresponding set of sample pairs ($b_t$, Volume_$b_t$) may be done with a Bézier curve of degree three. In yet another example the degree of the sample points may be a natural number at least greater than the degree of the Bézier curve. This ensures determining accurately an inflection point of the curve.

Examples are now described with reference to FIGS. 2 to 9.

The following example uses structural MRI images as input data. The structural MRI images are voxelized 3D medical images composed of a 3D grid of voxels, wherein each voxel is associated with a grayscale value. Each grayscale level reflects a tissue characteristic of the human brain. In normalized values, a grayscale value zero (i.e., black) reflects a lack of tissue characteristic of the human brain and a grayscale value one (i.e., white) reflects that the voxel reflects a tissue characteristic of the human brain. The size of voxels may be different among axis/directions (anisotropic resolution).

The brain extraction tool (BET) method is an algorithm that takes as input the structural MRI image and outputs a surface model. The BET method segments the input structural MRI image by segmenting voxels representing tissue of the brain from other voxels, thereby removing non-brain voxels. This process can be seen as a binary mask segmenting the brain on the input data. The algorithm takes as input the MRI images and a parameter $b_t$ (between 0 and 1), the latter modifies the detection of boundaries between brain voxels and non-brain voxels, thereby influencing the quality of the surface model.

Figure 2:
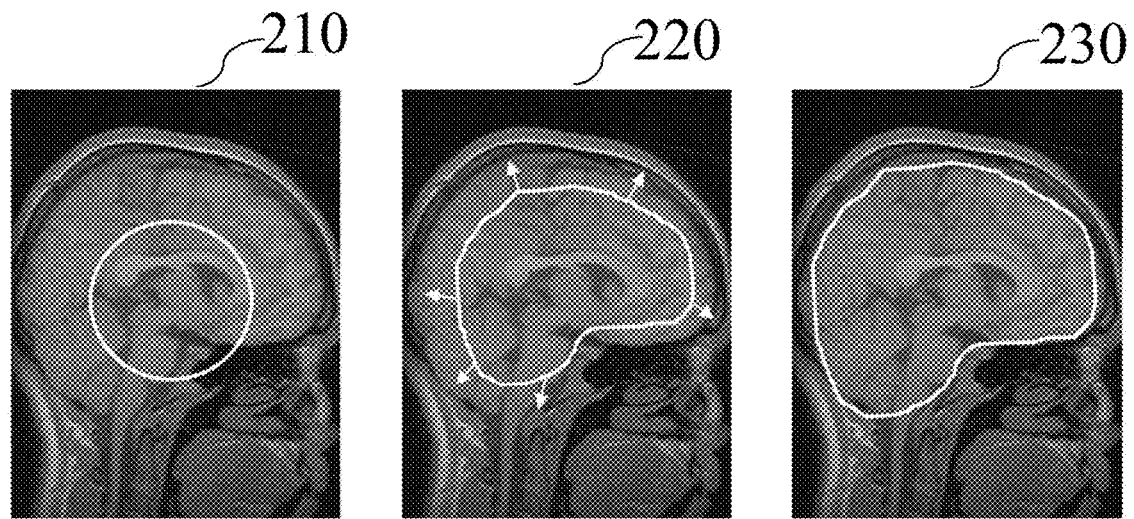
FIG. 2 shows an example of a brain extraction tool.

FIG. 2 illustrates the principle of the brain extraction tool.

The brain extraction tool initializes 210 a mesh sphere in the center of the head. Then, the brain extraction tool inflates 220 the mesh sphere outwards. White arrows illustrate the normal component of the movement vector that deforms the mesh. The brain extraction tool performs the inflation process and stops 230 when the vertices reach an abrupt variation of the gray level of the tissue of the brain. The abrupt variation is the detection of a black boundary corresponding to the medulla. The detection of the "abrupt variation" is dependent of the value of the fractional constant $b_t$, which is used to distinguish the different values of grayscale values of the brain tissue from the non-brain tissue.

Figure 3:
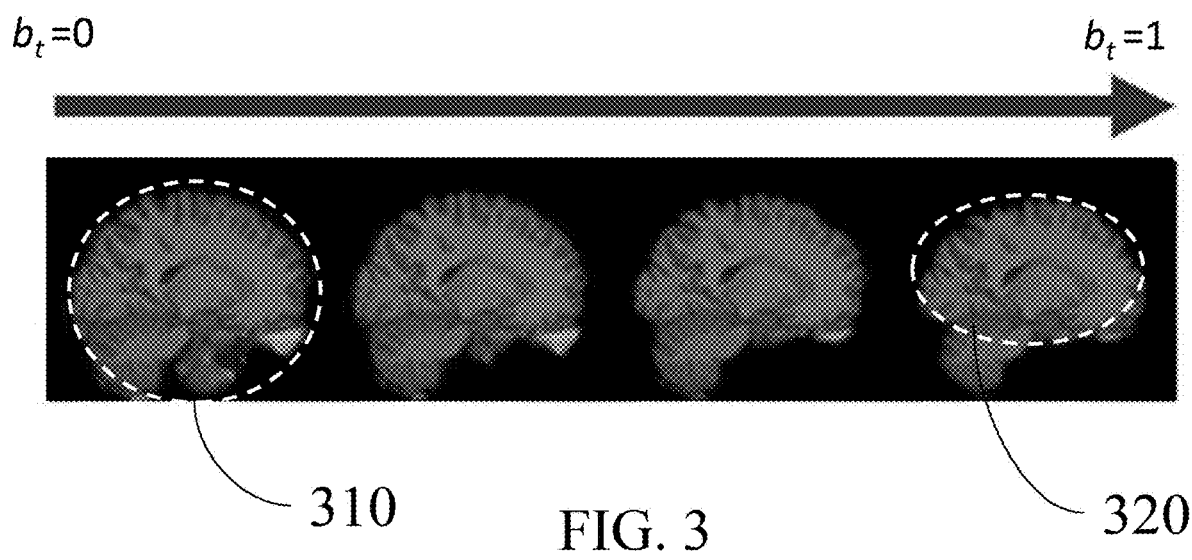
FIG. 3 shows an example of different surface models depending on the fractional constant $b_f$.

FIG. 3 illustrates the dependence of the BET method with respect to the fractional constant $b_t$, illustrating how each choice of fractional constant $b_t$ changes the detection of boundaries between vowels having gray levels characteristic of the tissue of the brain from other voxels.

In experiments, when $b_t$ is set too small (e.g., between 0 and 0.1), the segmentation is generally too wide. For example, the segmentation may define a volume, wherein the volume includes scalp optic nerf and other undesired non-brain tissue, leading to a wide segmented volume, shown as dashed circle in 310. When $b_t$ is too high (e.g., between 0.9 and 1), the BET method generates an under-estimation of the brain, thereby leading to a small volume, as shown in the segmentation 320. Experiments show that intermediate values provide better segmentations. The implementation thus proceeds to adjust the value of $b_t$ so that the segmentation remains accurate without including non-brain tissue, e.g., outputting the best segmentation among the values of $b_t$ between the output models indicated in 310 and 320.

In examples of the method, the method is implemented with three steps (this does not exclude additional steps): computation of sample volumes, smooth approximation of the samples, and approximation analysis.

1. Computation of Sample Volumes

The implementation runs the BET method for different values of $b_t$, for example 20 samples. The BET method used in this implementation is the one disclosed in "Fast Robust Automated Brain Extraction", Smith, S. M, 2002 November; 17(3):143-55. doi: 10.1002/hbm.10062. For each run, the implementation computes the volume size of the output of the BET method. In this implementation, the volume is computed by mathematical addition of the number of voxels of the structural image corresponding to the segmented mask determined by the BET method.

The set of sample pairs ($b_t$, Volume_$b_t$) is obtained by collecting each of the volume determined by the BET and the $b_t$ fractional constant used for determining the model surface.

In the current implementation, the sampling of the fractional constant $b_t$ is performed between 0.4 to 0.8 instead of being done uniformly over [0,1]. This choice allows to be more detailed on the sampling of correct values of the fractional constant $b_t$, as values outside the range may under-segment or over-segment the structural MRI image. Moreover, a second pass of the method may be done after the present run (e.g., re-sampling between 0.5 and 0.6 if the optimal choice is between that range). This second pass improves the level of accuracy of the segmentation, as the BET method is re-run but with a denser sampling near the plate of the curve obtained in this first run.

The sampling is performed with parallel runs for improving computation times with respect to a sequential sampling.

2. Smooth Approximation

Figure 4:
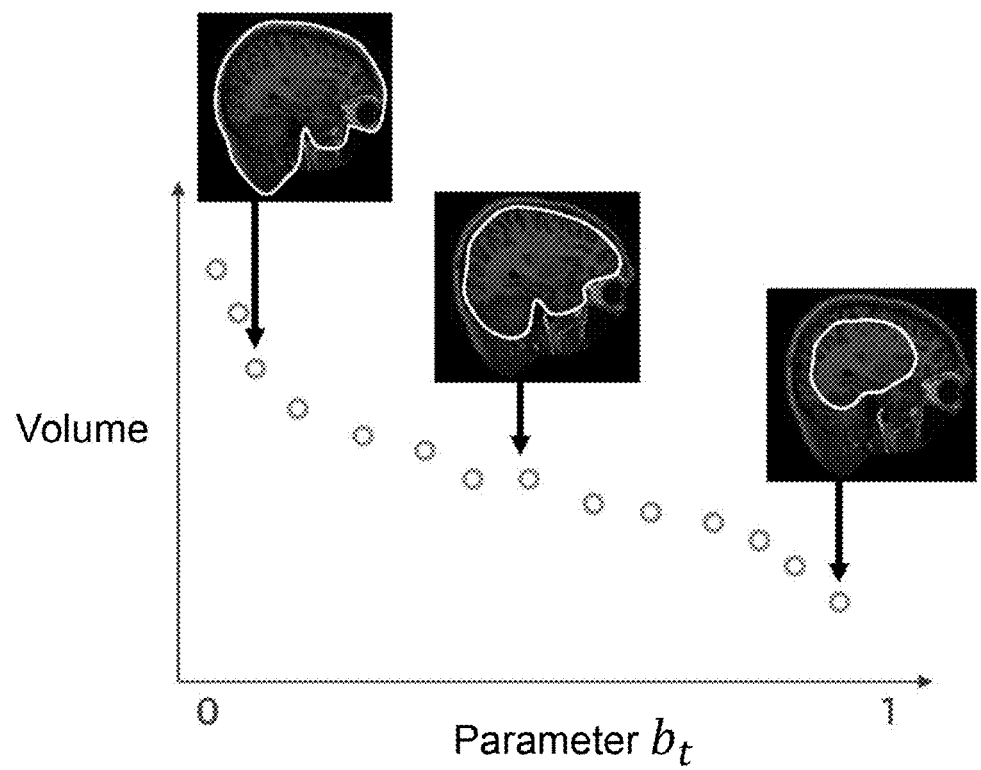
FIG. 4 shows a graph plotting different volume-fractional constant sample pairs ($b_f$, Volume_$b_f$)
Figure 5:
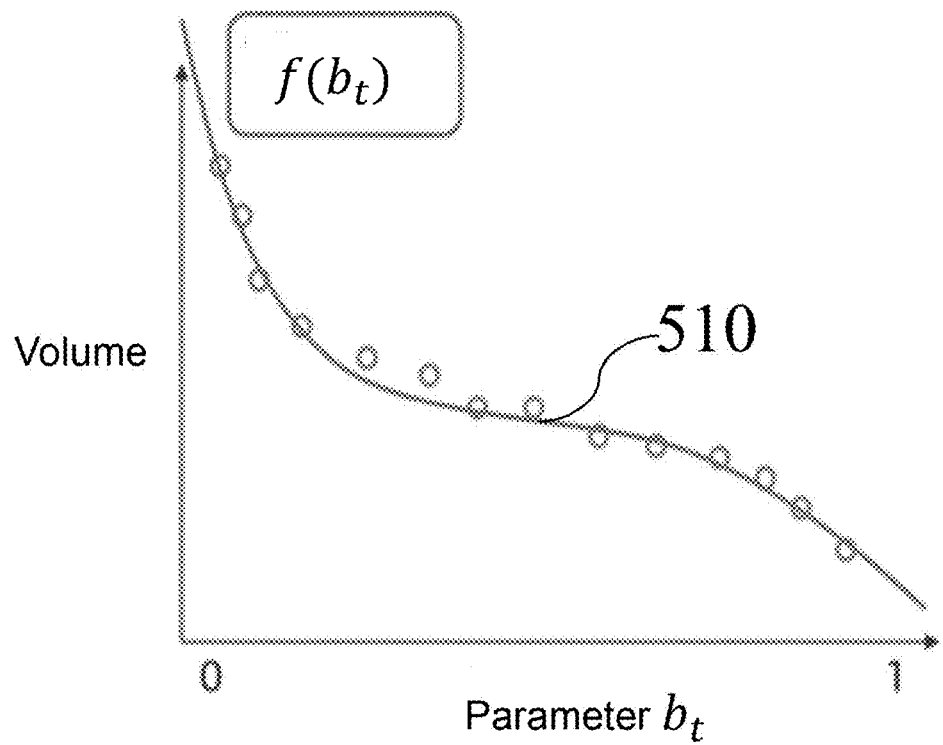
FIG. 5 shows an example fitting curve on the sample pairs.

As illustrated in FIG. 4, the implementation builds a volume size curve as a function of $b_t$ using the set of sample pairs ($b_t$, Volume_$b_t$). The volume size curve is a discrete curve in a discrete graph. As illustrated in FIG. 4, each point in the graph corresponds to an output surface model computed by the BET method. The discrete curve is first smoothed out to interpolate values in between the discrete volume values. FIG. 5 shows the approximation of the discrete curve by using a smooth curve. The implementation performs the approximation with a Bézier polynomic curve of degree 7.

The use of the polynomic curve in the implementation provides a correct compromise between having a regularized curve and the fitting on the set of sample pairs. The constraints of the plate and shape of the curve (e.g., asymmetric asymptotes) indicate that a degree of the polynomial to low (e.g., below four) cannot approximate the curve correctly while a degree too high (e.g., close to the number of samples) does not regularize/overfit the curve.

The approximation of the polynomic curve is computed by solving the least squares problem:

$$\min_{a \in \mathbb{R}^7} \|M \times a - V\|^2$$

-continued

Where:

$$M_{i,j+1} = \binom{7}{j}(b_i)^7(1-b_i)^{7-j} \text{ with } 0 < i \leq \text{ number of samples and } 0 \leq j \leq 7$$

$V_i = \text{Volume\_b}_i$ with $0 < i \leq$ number of samples.

Solving the least square problem gives an a vector of Bézier control points. The control points yield the following expression for the Bézier polynomic curve of degree 7:

$$f = t \rightarrow \sum_{k=0}^{7} a_k \binom{7}{k} t^k (1-t)^{7-k}$$

3. Analysis of the Approximation Curve

Small variations around a correct (meaning satisfactory) fractional constant $b_t$ will produce small variation in segmentation (and thus a similar volume). This is represented, in FIG. 5, as a flat region 510 in the curve. The flat region can be detected by searching for the inflection point of the Bézier polynomic curve.

To perform the search, the implementation uses the first analytical derivative of the Bézier function, with the coefficients $a_k$ found by solving the least squares problem. The first derivative is expressed as:

$$f' = t \rightarrow \sum_{k=1}^{6} a_k \left( \binom{7}{k} k t^{k-1}(1-t)^{7-k} - \binom{7}{k}(7-k)t^k(1-t)^{7-k-1} \right) - 7a_0(1-t)^6 + 7a_7 t^6$$

The implementation finds the values of the inflection point by locating local maximum or maxima of the first derivative (it can be done as well by searching for zeros of the Bézier curve's 2nd derivative). In the case of the implementation, as the function is regular, the search of maxima is done on a uniform sampling of 200 points.

Figure 6:
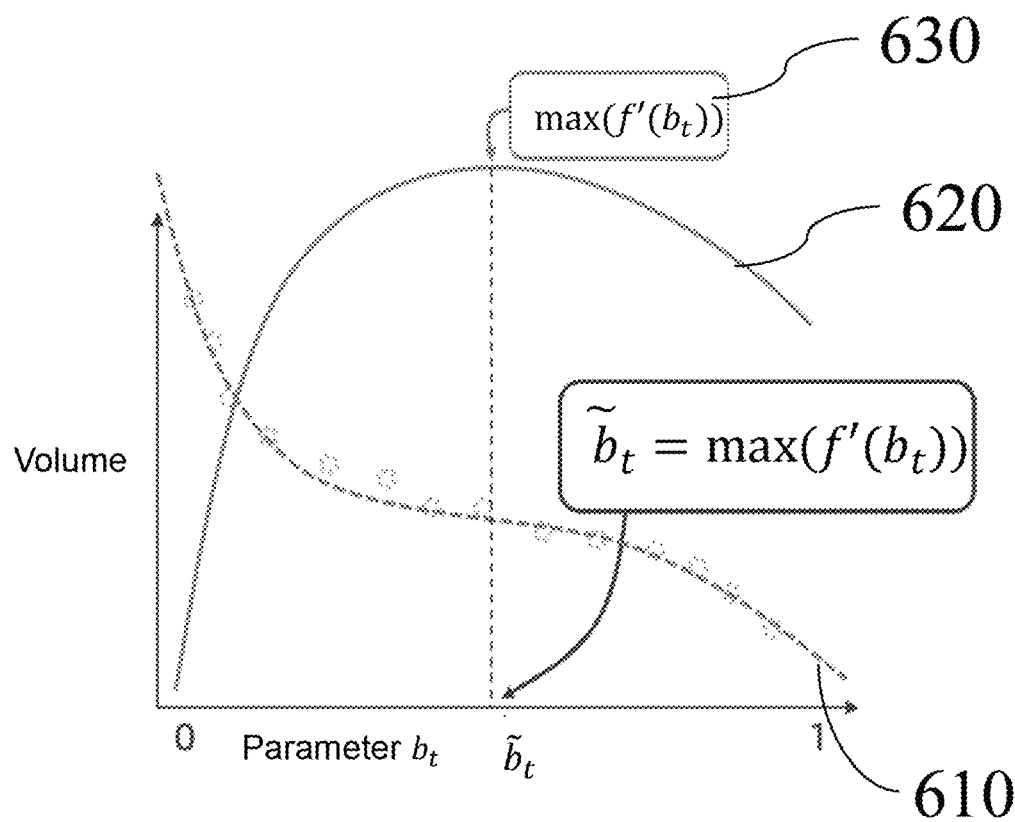
FIG. 6 shows an inflection curve of the curve.

FIG. 6 illustrates the implementation. The curve 610 corresponds to the Bézier polynomic curve of degree 7 that approximate the samples. The curve 620 illustrates the curve of the corresponding derivative. The maximum value of the derivative 630 is indicated for the sake of illustration.

The maximum is used to compute the surface model by setting the maximum as a new parameter for the BET method. In case of multiple maxima, the method chooses the maxima with the smallest volume. This is only a matter of implementation, and corresponds to a tradeoff of choosing the smallest volume that provides the most accurate segmentation.

Ground Truth Verification

The output of the implementation is compared with ground truth using 3 different metrics: the Dice Score giving the percentage of overlapping between the output and ground truth, the average and the 95th percentile of the whole distance between surface's segmentations.

Figure 7A:
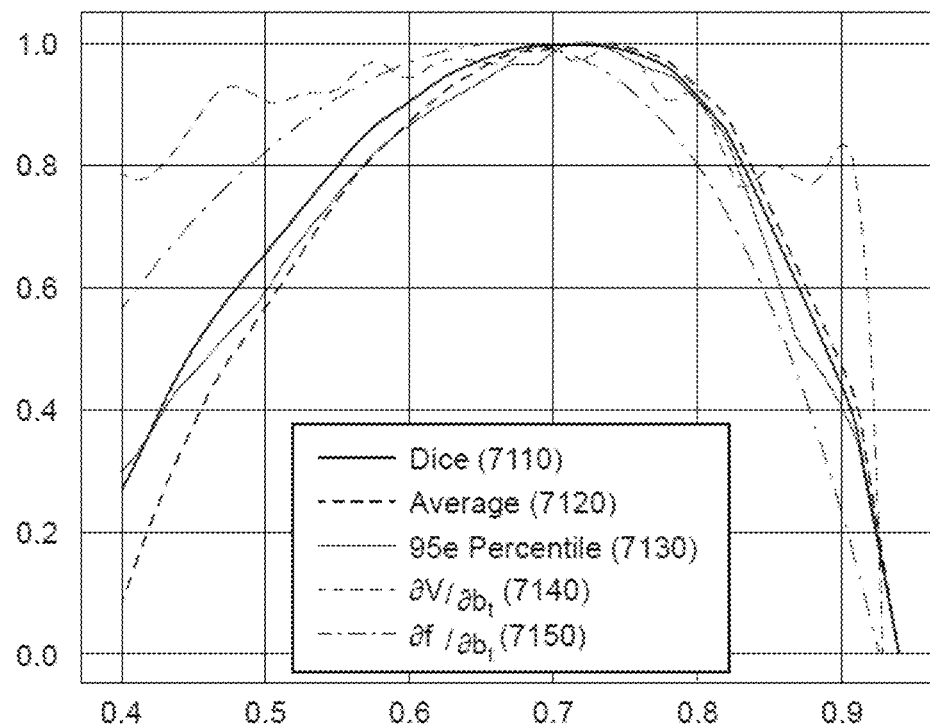
FIGS. 7A, 7B, 7C and 7D show different implementation examples accompanied of error metrics.
Figure 7B:
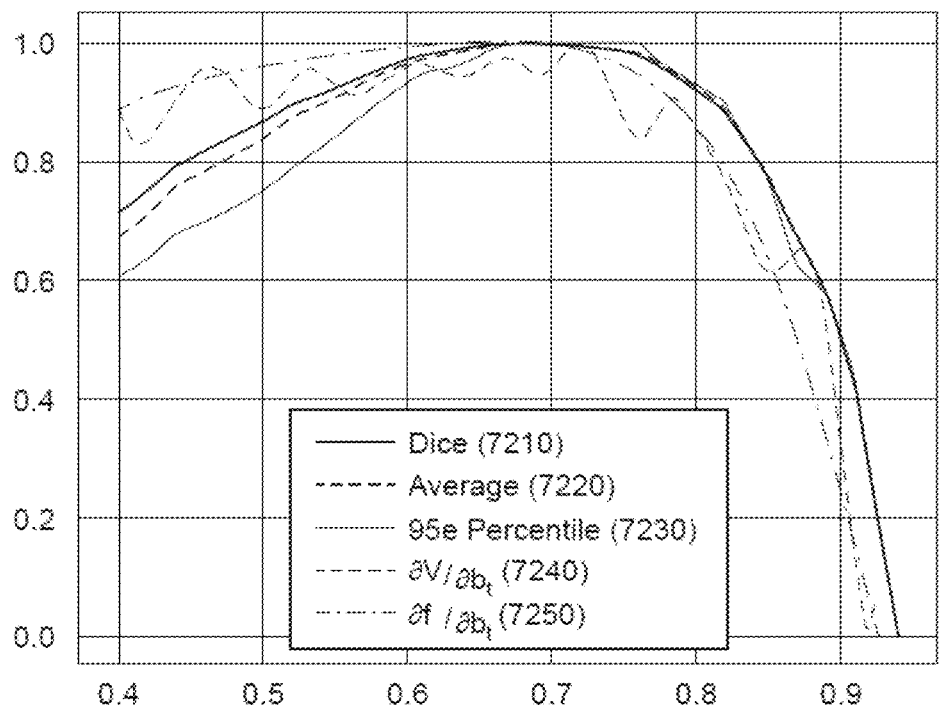
Figure 7C:
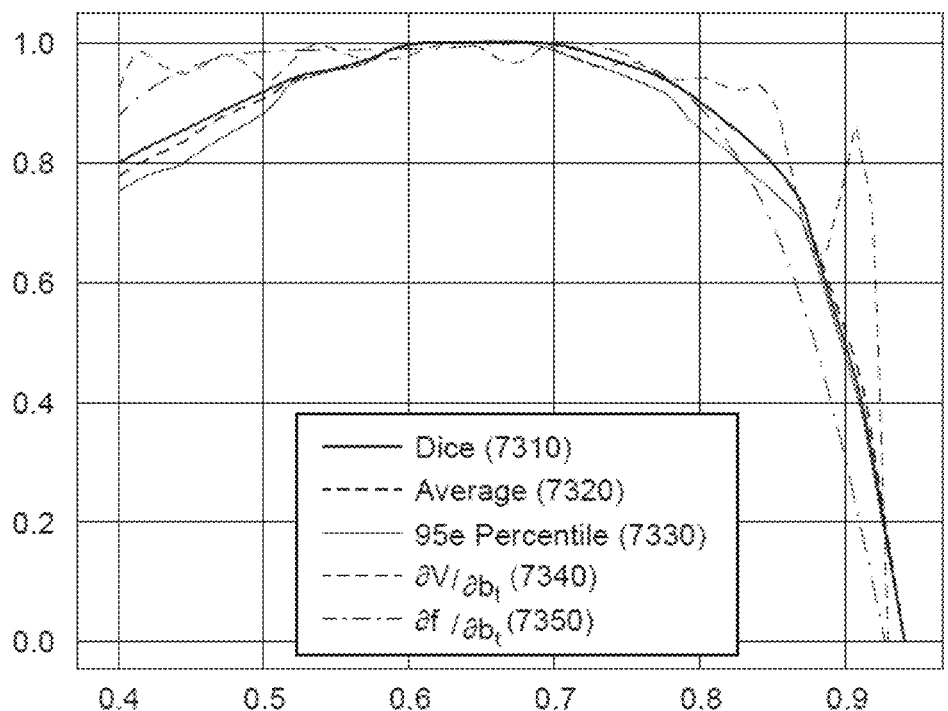
Figure 7D:
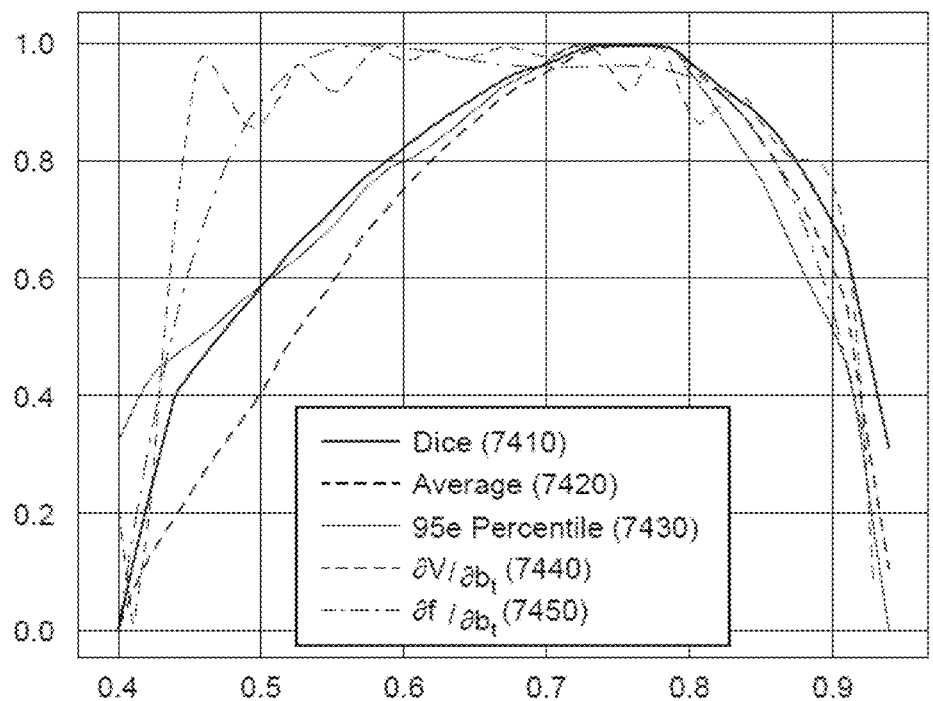

FIGS. 7A to 7D show different graphs corresponding to different runs of and the comparison with ground truth with the three different metrics. Each of FIGS. 7A to 7B show four curves: a curve of the Dice score, a curve for the average, a curve for the 95th percentile, a curve for the raw derivative of the set of sample values $\partial V/\partial b_t$ (that is, without approximation) and the derivative of the Bézier curve $\partial f/\partial b_t$ fitted to the set of sample pairs. FIG. 7A shows Dice score curve 7110, a curve for the average 7120, a curve for the 95th percentile 7130, a curve for the raw derivative 7140 and a curve for the derivative of the Bézier curve 7150. It can be observed that the curves 7110, 7120 and 7130 attain a maximum at a point quite close to the maximum point of the curve 7150. That is, the curves confirm that, compared with ground truth data, the output surface model corresponding to the identified fractional constant $b_t$ is indeed quite accurate. It also shows the smooth approximation achieved with the Bézier curve. FIG. 7B shows Dice score curve 7210, a curve for the average 7220, a curve for the 95th percentile 7230, a curve for the raw derivative 7240 and a curve for the derivative of the Bézier curve 7250. The curves behave similarly as FIG. 7A. FIG. 7C shows Dice score curve 7310, a curve for the average 7320, a curve for the 95th percentile 7330, a curve for the raw derivative 7340 and a curve for the derivative of the Bézier curve 7350. The curve 7350 also shows a case where two maximum are identified on the smooth approximation (at about values of 0.6 and 0.7 of the fractional constant $b_t$). The implementation chooses the largest maximum. FIG. 7D shows Dice score curve 7410, a curve for the average 7420, a curve for the 95th percentile 7430, a curve for the raw derivative 7140 and a curve for the derivative of the Bézier curve 7450. FIG. 7D highlights that using the discrete curve from the sampling yields to unstable raw derivatives (e.g., ref. 7440 of the first image), which is improved by the smooth approximation (e.g., ref. 7450 of the first image). The examples were taken from two annotated datasets OASIS and LPBA40, which can be consulted from the references:

David W Shattuck, et. al., "*Construction of a 3D probabilistic atlas of human cortical structures*" Science Direct. www.sciencedirect.com/science/article/abs/pii/S1053811907008099?via %3Di hu.

Daniel S. Marcus et. al., "*Open Access Series of Imaging Studies (OASIS): Cross-sectionalMRI Data in Young, Middle Aged, Nondemented, and Demented Older Adults*". In: Journal of Cognitive Neuroscience19.9 (September 2007), p. 1498-1507ISSN: 0898-929X, 1530-8898.DOI:10.1162/jocn.2007.19.9.1498. www.mitpressjournals.org/doi/10.1162/jocn.2007.19.9.1498.

Prototype Implementation

Following use cases has been obtained with the implementation of a prototype. In this prototype, the derivative has been obtained by simple numerical difference i.e., $f'(x_t) = (f(x_{t-1}) - f(x_t))/(x_{t-1} - x_t)$.

According to data set publication, an expert has checked ground truth mask used for following score computation.

Figure 8:
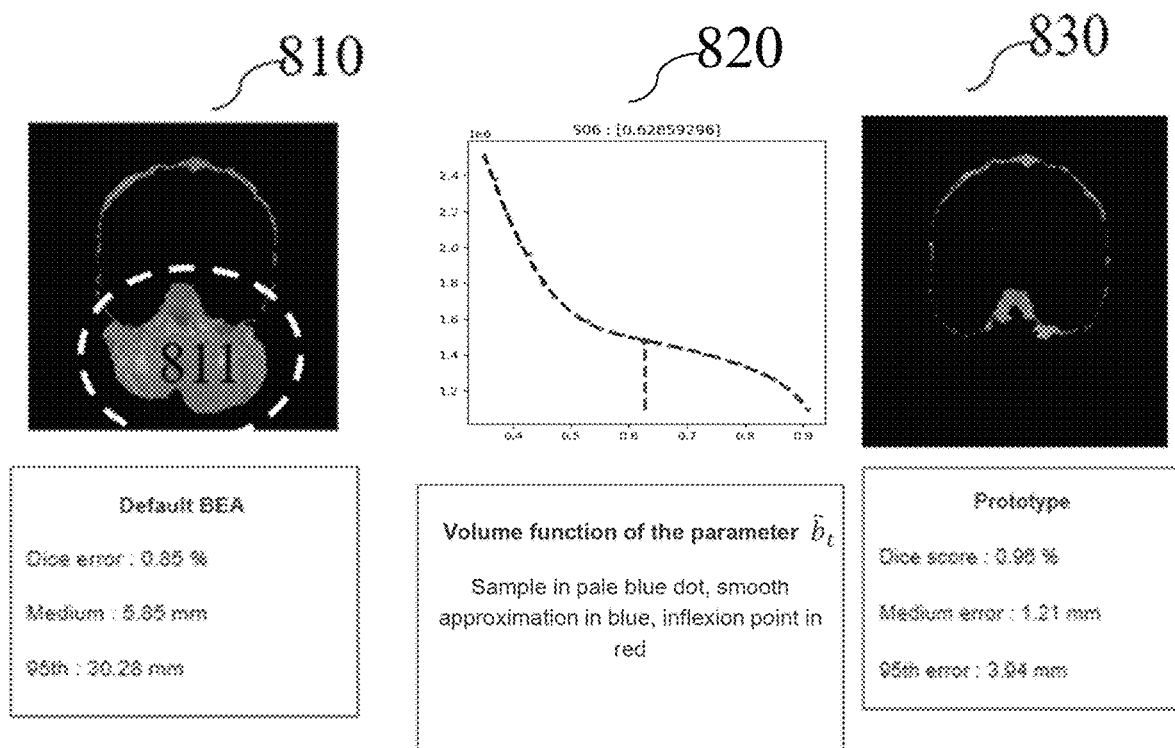
FIG. 8 shows a comparison between a segmented brain computed according to the prior art and a segmented brain computed according to the method.

FIG. 8 shows a first segmentation 810 made with a default recommended BET fractional constant $b_t = 0.5$. The segmentation 810 shows a region 811 that represents over-segmented voxels. This corresponds to a massive over-segmentation of the brain, as the segmentation includes a large region below the brain. This leads to a low matching score.

The curve 820 illustrates the implementation of the prototype, which proposes $b_t = 0.63$ as a best parameter. The corresponding segmentation 830 is the correspondent segmentation, which shows improved matching scores (i.e., larger dice score, lower medium error and lower 95$^{th}$ percentile error).

Figure 9:
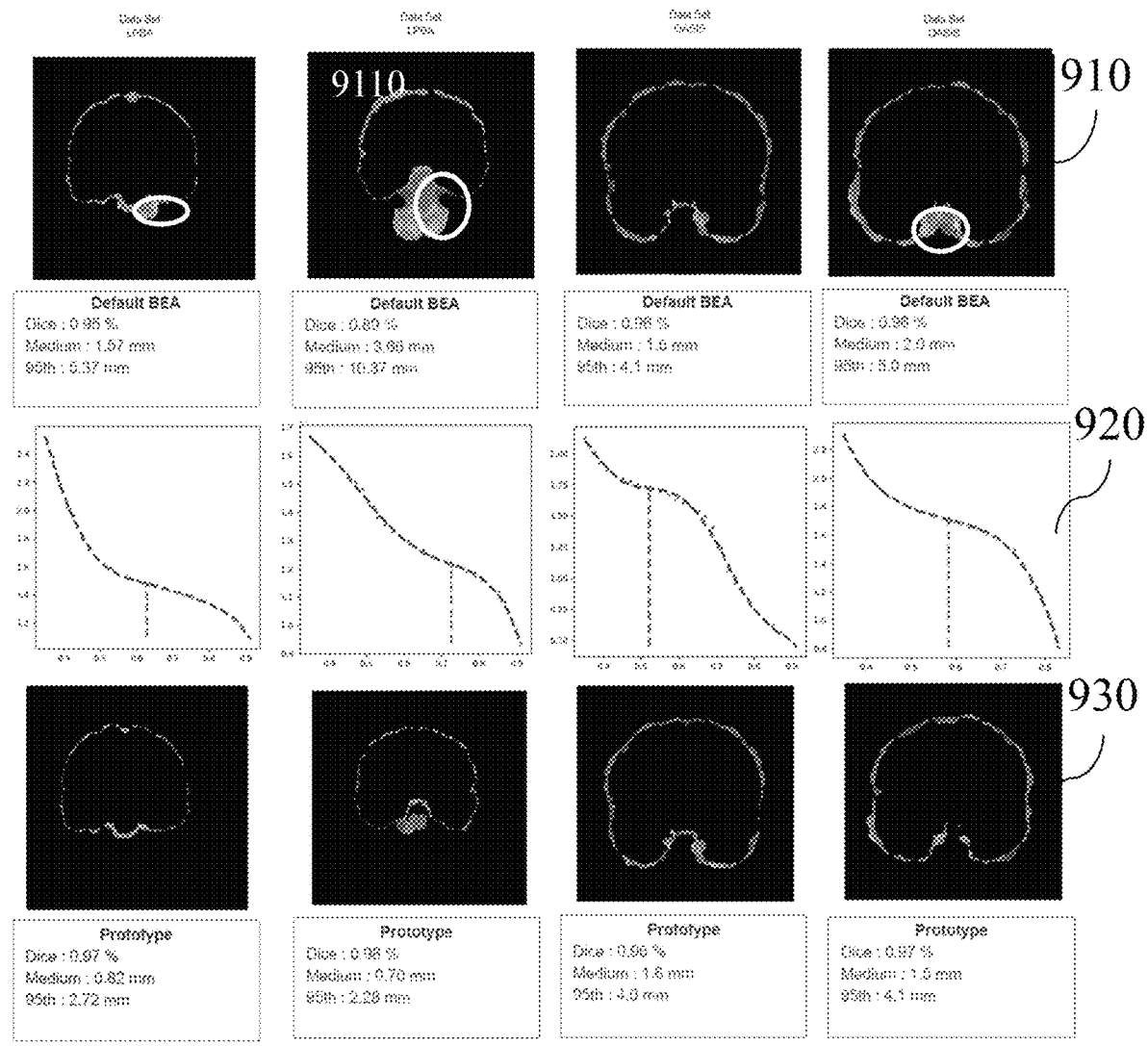
FIG. 9 shows other comparisons between segmented brains computed according to the prior art and segmented brains computed according to the method.

FIG. 9 shows four other examples, illustrating the automatic fine-tuning achieved by the implementation compared to the default recommended fractional constant versus BEA with $b_t$=0.5. The segmentations in ref. 910 correspond to the output of the BET method with the default fractional constant. For instance, the circle 9110 represents an over segmented area of non-brain tissue. Ref. 920 corresponds to the implementation of the smooth curve, shown as a curved line. The vertical dashed line illustrates the position of the inflection point in the graph. Ref. 930 shows the corresponding output of the method with respect to each inflection point. FIG. 9 also highlights the variability of the correct parameter value: even for similar MRI belonging to the same data set, automatically suggested parameter $b_t$ can be very different. However, accuracy is high: indeed, all of the outputs show a Dice score of above 96%, a small medium and a small 95th percentile, showing a clear improvement over the default method.

The invention claimed is:

1. A computer-implemented method of segmentation of a medical image of a human brain, comprising:
    obtaining a voxelized 3D medical image of the human brain, each voxel of the 3D medical image having at least one value representing a tissue characteristic of the human brain;
    computing at least two surface models of the human brain using a brain extraction tool method that is dependent of a fractional constant $b_t$ varying between 0 and 1, each surface model being computed for a unique fractional constant $b_t$;
    for each computed surface model, determining a volume Volume_$b_t$ included in the computed surface model, thereby obtaining a set of sample pairs ($b_t$, Volume_$b_t$);
    fitting a curve to sample pairs ($b_t$, Volume_$b_t$) of the set;
    determining an inflection point of the curve;
    identifying a fractional constant $\tilde{b}_t$ corresponding to the determined inflection point; and
    computing the surface model of the human brain using the BET method that is dependent of the identified fractional constant $\tilde{b}_t$.

2. The computer-implemented method of claim 1, wherein the voxelized 3D medical image is a magnetic resonance imaging (MRI) image.

3. The computer-implemented method of claim 1, wherein the curve is a smooth curve.

4. The computer-implemented method of claim 3, wherein the smooth curve is a Bézier curve.

5. The computer-implemented method of claim 4, wherein the Bézier curve is of degree larger than four and lower than eight.

6. The computer-implemented method of claim 5, wherein the fitting the curve includes solving a least squares problem.

7. The computer-implemented method of claim 1, wherein determining the inflection point of the curve includes:
    computing a first derivative of the curve, and
    computing an inflection point of the curve from a point where the first derivative of the curve is zero.

8. The computer-implemented method of claim 7, wherein computing the first derivative includes computing finite differences between sample points of the curve.

9. The computer-implemented method of claim 7, wherein computing the inflection point of the curve includes:
    computing a second derivative of the curve, and
    computing the inflection point of the curve by:
        sampling uniformly points of the second derivative of the curve, determining sampled points of the second derivative of the curve having value zero,
        computing a neighborhood of sampled points enclosing the determined points having value zero, and
        determining a change of sign for at least one pair of sample points at the neighborhood of sampled points.

10. The computer-implemented method of claim 7, wherein identifying the fractional constant $\tilde{b}_t$ corresponding to the determined inflection point, is performed by setting the determined inflection point as the fractional constant $\tilde{b}_t$.

11. The computer-implemented method of claim 1, wherein computing the at least two surface models of the human brain is parallelized over the samples of the fractional constant $b_t$.

12. The computer-implemented method of claim 1, wherein the obtained set of sample pairs ($b_t$, Volume_$b_t$) is determined for the fractional constant $b_t$ that is included between the interval [0.4, 0.8].

13. A device comprising:
    a non-transitory computer readable data storage medium having recorded thereon a computer program comprising instructions for segmentation of a medical image of a human brain that when executed by a processor causes the processor to be configured to:
    obtain a voxelized 3D medical image of the human brain, each voxel of the 3D medical image comprising at least one value representing a tissue characteristic of the human brain,
    compute at least two surface models of the human brain using a brain extraction tool method that is dependent of a fractional constant $b_t$ varying between 0 and 1, each surface model being computed for a unique fractional constant $b_t$,
    for each computed surface model, determine a volume Volume_$b_t$ comprised in the computed surface model, thereby obtaining a set of sample pairs ($b_t$, Volume_$b_t$),
    fit a curve to sample pairs ($b_t$, Volume_$b_t$) of the set,
    determine an inflection point of the curve,
    identify a fractional constant $\tilde{b}_t$ corresponding to the determined inflection point, and
    compute the surface model of the human brain using the BET method that is dependent of the identified fractional constant $\tilde{b}_t$.

14. The device of claim 13, wherein the curve is a smooth curve.

15. The device of claim 14, wherein the smooth curve is a Bézier curve, the Bézier curve being of degree larger than four and lower than eight.

16. The device of claim 13, wherein the processor is further configured to determine the inflection point of the curve by being configured to:
    compute a first derivative of the curve, and
    compute an inflection point of the curve from a point where the first derivative of the curve is zero.

17. The device of claim 16, wherein the processor is further configured to compute the inflection point of the curve by being configured to:
    compute a second derivative of the curve, and compute the inflection point of the curve by being configured to:
sample uniformly points of the second derivative of the curve, determine sampled points of the second derivative of the curve having value zero,
compute a neighborhood of sampled points enclosing the determined points having value zero, and
determine a change of sign for at least one pair of sample points at the neighborhood of sampled points.

18. The device of claim 16, wherein the processor is further configured to identify the fractional constant $\tilde{b}_t$ corresponding to the determined inflection point by being configured to set the determined inflection point as the fractional constant $\tilde{b}_t$.

19. The device of claim 13, wherein the obtained set of sample pairs ($b_t$, Volume_$b_t$) is determined for the fractional constant $b_t$ that is included between the interval [0.4, 0.8].

20. The device of claim 13, further comprising the processor coupled to the data storage medium.

* * * * *